United States Patent
Berardo

(10) Patent No.: US 6,837,187 B2
(45) Date of Patent: Jan. 4, 2005

(54) DEVICE FOR COLLECTION OF ANIMAL WASTE

(76) Inventor: Carmen R. Berardo, 3185 S. Sydenham St., Philadelphia, PA (US) 19145

(*) Notice: Subject to any disclaimer, the term of this patent is extended or adjusted under 35 U.S.C. 154(b) by 0 days.

(21) Appl. No.: 10/692,914

(22) Filed: Oct. 24, 2003

(65) Prior Publication Data

US 2004/0144334 A1 Jul. 29, 2004

Related U.S. Application Data

(60) Provisional application No. 60/421,434, filed on Oct. 25, 2002.

(51) Int. Cl.[7] .............................................. A01K 27/00
(52) U.S. Cl. .......................... 119/792; 119/868; 294/1.3
(58) Field of Search ................................. 119/792, 793, 119/850, 854, 867, 868, 869, 809; 294/1.3

(56) References Cited

U.S. PATENT DOCUMENTS

| | | |
|---|---|---|
| 1,217,567 A | 2/1917 | Clare |
| 1,656,328 A | 1/1928 | Le Cras |
| 2,585,251 A | 2/1952 | Kahlert |
| 3,656,459 A | 4/1972 | Missud |
| 3,786,787 A | 1/1974 | Weinberger |
| 3,817,217 A | 6/1974 | Matuka et al. |
| 4,095,562 A | 6/1978 | Graham |
| 4,269,148 A | 5/1981 | Holley-Donawa |
| 4,290,386 A * | 9/1981 | Eiriksson ................... 119/868 |
| 4,444,152 A | 4/1984 | Berardo |
| 4,510,887 A | 4/1985 | Lincoln et al. |
| 4,709,661 A * | 12/1987 | Mayle, Jr. ................. 119/868 |
| 4,969,419 A | 11/1990 | Fong |
| 5,146,874 A * | 9/1992 | Vidal ........................ 119/868 |
| 5,226,386 A * | 7/1993 | Thoma ....................... 119/869 |
| 5,315,960 A * | 5/1994 | Lamp ........................ 119/868 |
| 5,355,836 A | 10/1994 | Vallery |
| 5,386,801 A | 2/1995 | Chinn et al. |
| 5,386,802 A * | 2/1995 | Hang-Fu .................... 119/868 |
| 5,427,059 A | 6/1995 | Logan et al. |
| 5,813,369 A | 9/1998 | Fujinaga |
| 5,819,691 A | 10/1998 | Lavi et al. |
| 5,937,795 A | 8/1999 | Raphael |
| 6,368,313 B1 * | 4/2002 | Howard ................. 604/385.09 |
| 6,394,041 B1 * | 5/2002 | Katz .......................... 119/868 |
| 6,457,440 B1 * | 10/2002 | Liburd ....................... 119/868 |
| 6,494,168 B2 * | 12/2002 | Weng ........................ 119/868 |
| 6,543,390 B2 * | 4/2003 | Lowery ...................... 119/771 |
| 6,708,650 B1 * | 3/2004 | Yates ........................ 119/792 |
| 2002/0121247 A1 * | 9/2002 | Sharpe ....................... 119/820 |

* cited by examiner

Primary Examiner—Yvonne R. Abbott
(74) Attorney, Agent, or Firm—Synnestvedt & Lechner LLP

(57) ABSTRACT

A harness provides comfortable yet secure fastening of the device to the animal. The harness may include a tail strap passing above the animal's tail, a leg strap passing below the anus, back straps passing over the back and connecting the tail and leg straps adjacent the anal region, a chest strap joined to the back straps and encircling the chest, leg loops joined to the leg strap encircling an upper thigh portion of the hind legs, and leg braces joining the back straps to the leg loops. A plurality of fastening devices are positioned on the harness for fastening a collection bag adjacent the animal's anal region. The leg loops may be at least partially formed by a distinct, continuous strip that forms at least part of a respective back strap. The back straps may overlap between the tail and chest straps.

28 Claims, 4 Drawing Sheets

DEVICE FOR COLLECTION OF ANIMAL WASTE

CROSS-REFERENCE TO RELATED APPLICATION

This application claims the benefit of U.S. Provisional Patent Application No. 60/421,434, filed Oct. 25, 2002, the entire disclosure of which is hereby incorporated herein by reference.

FIELD OF THE INVENTION

The present invention relates to a device for collection of animal waste deposits.

BACKGROUND

The problem of the collection and disposal of animal waste deposits and particularly those from pet dogs has come under increasing public scrutiny in recent years. In cities and central areas of suburban communities, the problem is especially acute since there are few places where pets can be properly exercised. It is thus still common practice for owners to "walk the dog" on sidewalks. In areas of high population density, animal wastes accumulate on public walkways and park grounds, creating a threat to public health as well as offensive sights and odors. Some cities have passed laws requiring pet owners to clean up wastes deposited by their pets with violators being subject to a substantial fine.

In an effort to alleviate the above problem and to comply with clean up laws, various devices and techniques have been proposed for collecting and disposing of animal wastes. The device most commonly used by dog owners is a small shovel or scoop for picking up the wastes and transferring them into a small container or disposable bag. This method is both inconvenient and unpleasant and makes it necessary for the owner to carefully observe the dog's activities and to carry an implement and a container ready for use. The use of a scoop or shovel has additional shortcomings, particularly in that it is not usually possible to remove all of the wastes from the ground. Furthermore, the scoop or shovel must be cleaned following use if it is to be brought indoors. The difficulties associated with the use of shovel or scoop devices are sufficient to discourage their use.

Another type of device for coping with the problem of animal wastes is worn by the animal and is intended to catch the animal's wastes immediately upon discharge. Such proposed devices typically include a harness which is strapped onto the hind quarters of the animal, and a receptacle designed for attachment to the harness proximate the anal region of the animal. Such a device effectively prevents animal wastes from contacting and soiling the ground or other surface and eliminates offensive sights and odors. The animal owner is spared the need to handle the wastes with shovels or scoops and need not watch the animal's every movement since the time and place of waste elimination are no longer important.

The harness and receptacle type of device, although proposed long ago, has not become popular with pet owners and its use has been limited principally to larger animals such as horses in special situations, such as horse-drawn cart rides through city parks. Although there are obvious advantages to the harness and receptacle type of devices, it is believed that their use has been restricted by the cost of producing the special receptacles which have characterized proposed devices. Examples of different types of harnesses and receptacles are shown in U.S. Pat. Nos. 2,585,251, 3,786,787, 3,817,217, and 4,095,562.

Although several of the above-identified patents describe the receptacles as being disposable, the receptacles in each instance are of a special construction customized to cooperate with a particular harness construction. These receptacles furthermore typically include either snap fasteners or adhesive portions, etc. which make the receptacles expensive to manufacture. The complicated structures of the previously proposed devices and the resultant expense of their manufacture are considered to be principally responsible for the failure of the devices to attain any significant degree of popularity. The inventor hereof is also the inventor of the device disclosed in U.S. Pat. No. 4,444,152, the disclosure of which is hereby incorporated therein by reference, which addresses these concerns to a certain extent.

SUMMARY

The present invention provides a device for collecting animal waste deposits which, although of the harness and receptacle type, employs a conventional small plastic garbage bag as the disposable receptacle. The harness provides for particularly comfortable yet secure fastening to the animal, and preferably includes a chest strap, leg loops, leg braces and a collar strap, each of which may be formed of elastic webbing, and adjustable fasteners. The harness defines a plurality of fastening points for the bag that are spaced peripherally around the anus of the animal. Selectively releasable fastening devices secured to the harness at the fastening points secure the open end of the bag in a position encircling the anal region of the animal. In a preferred embodiment, the fastening devices include loop and stud type fasteners that can readily be attached and detached from the open edge of the bag. In a certain embodiment, the harness supports four such fasteners, collectively located above, below, and to each side of the anus of the animal. The harness may include fasteners for attaching an article of clothing for the animal.

DETAILED DESCRIPTION

Figure 1:
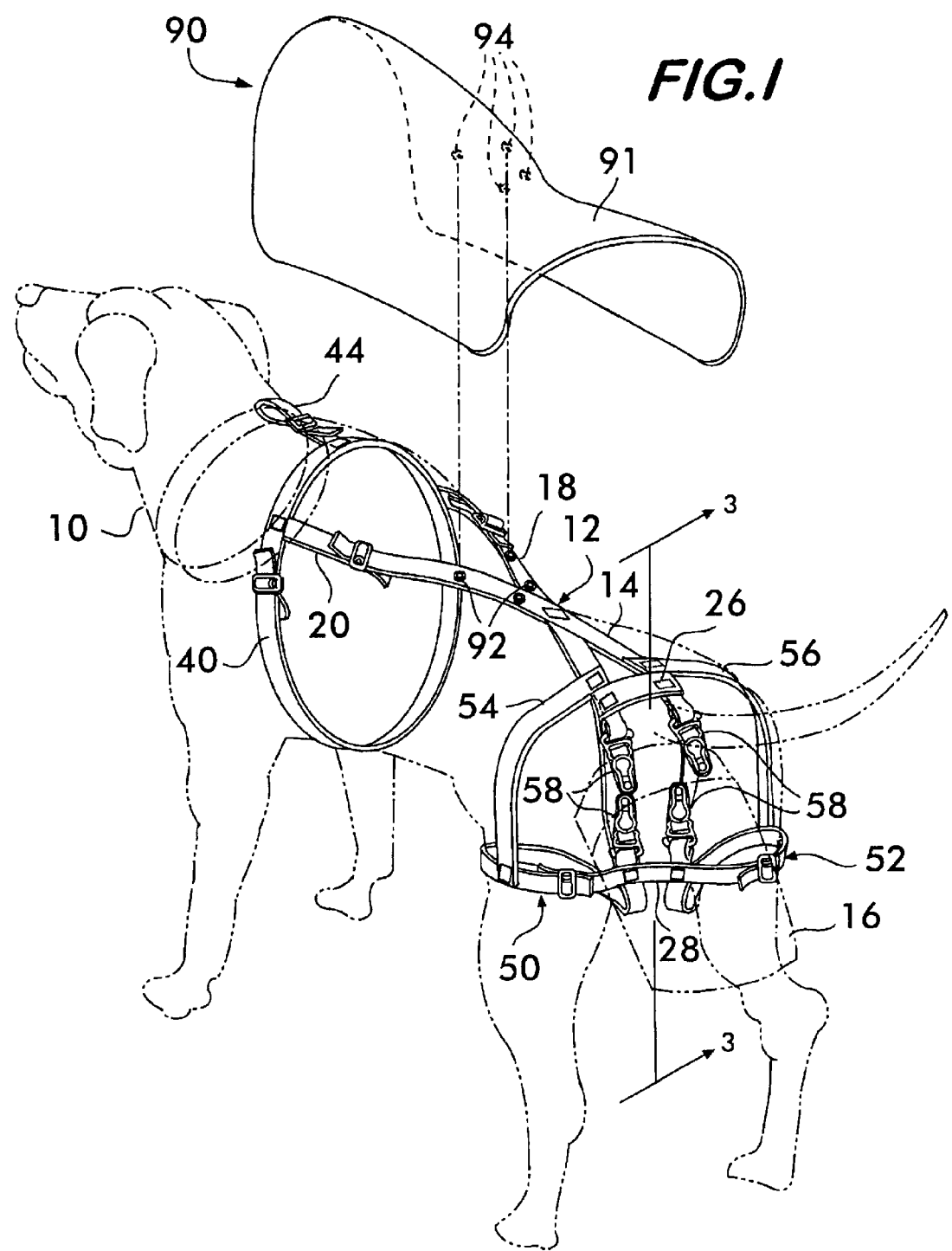
FIG. 1 is an isometric view of a collection device in accordance with the present invention, shown in relationship to a dog.

Referring to the drawings and particularly FIG. 1 thereof, a dog 10 is shown wearing a device 12 for collection of animal waste in accordance with the present invention. As shown in FIGS. 1 and 3, the device 12 includes a harness assembly 14 and a collection bag 16 demountably attached to the harness 14. The harness 14 includes fastening devices for supporting the collection bag 16 so that the open end of the bag is held in an open position around the anus of the animal to collect the wastes emanating therefrom, as best shown in FIG. 3. Details of the harness assembly, fastening devices and the bag may be gained from the enlarged views of FIGS. 1–5.

Figure 2:
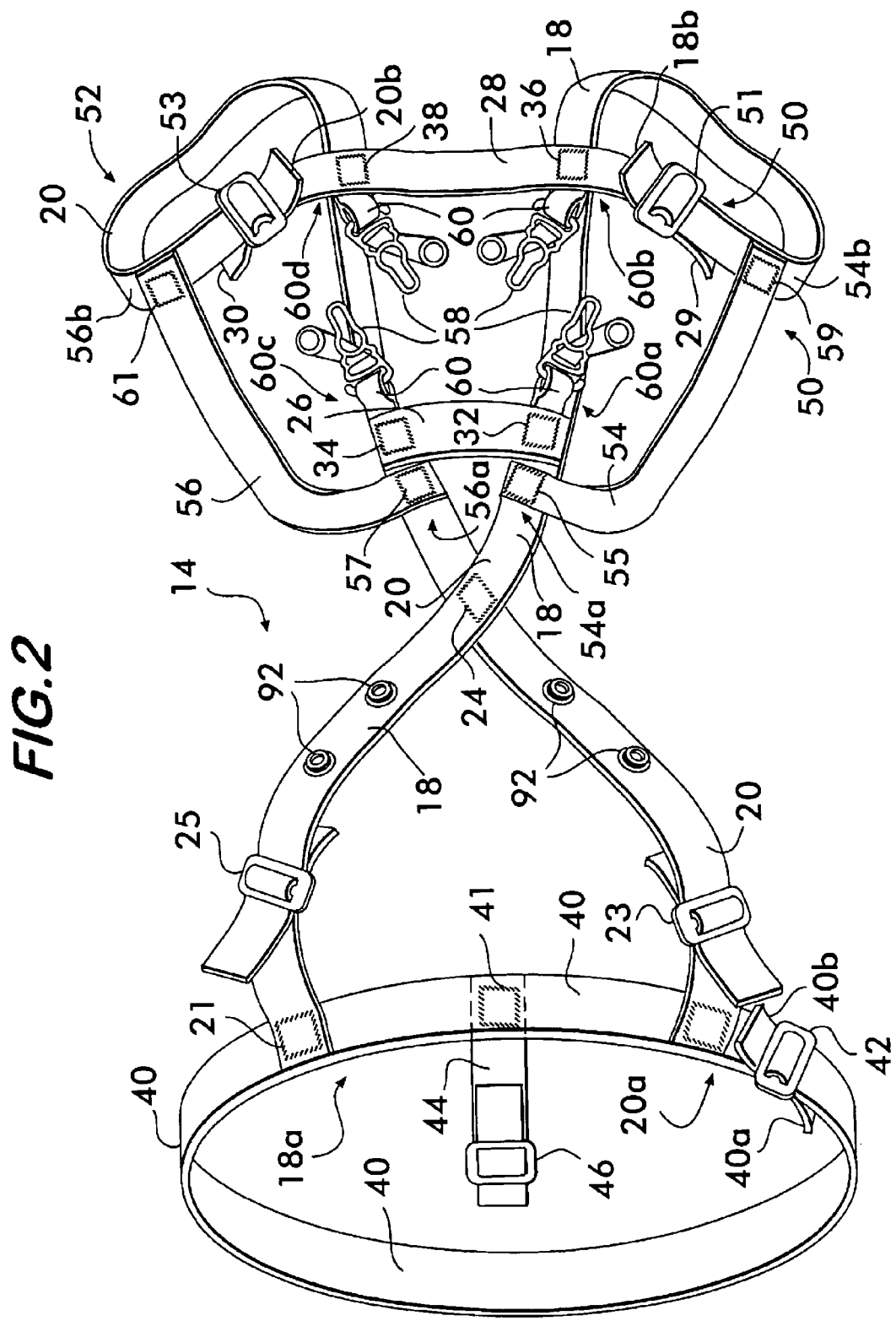
FIG. 2 is a plan view of the harness assembly of the collection device of FIG. 1.
Figure 3:
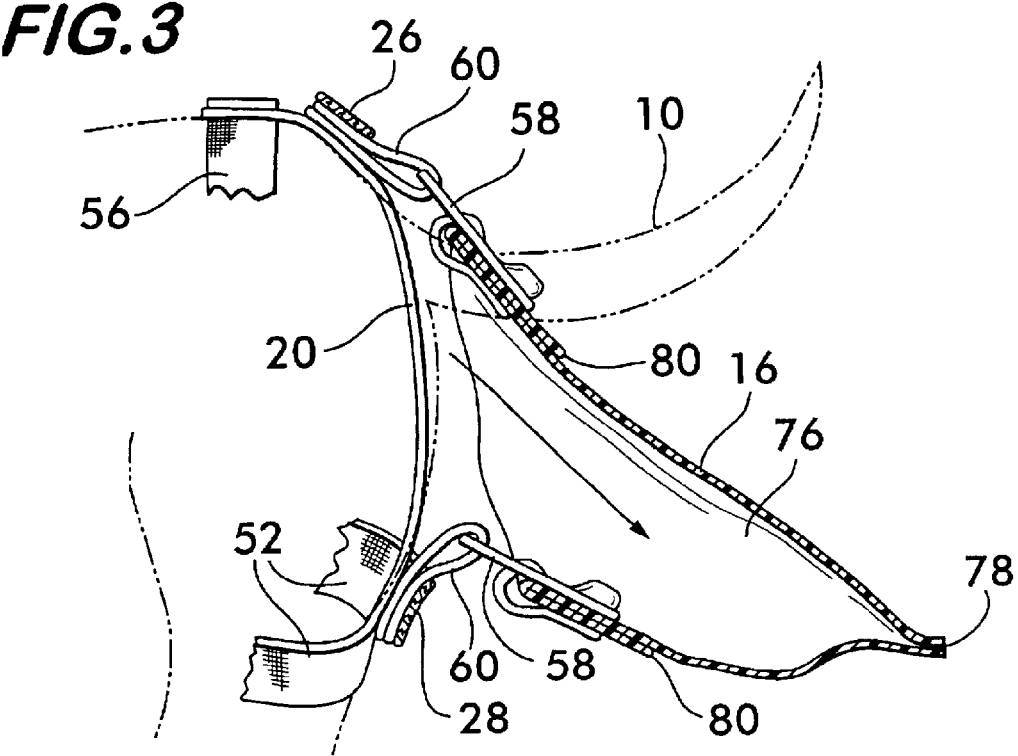
FIG. 3 is a partial cross-sectional view of the collection device of claim 1, taken along line 3—3 of FIG. 1.

With reference to FIG. 2, the preferred harness assembly 14 is formed of several strips of webbing, which is preferably an elastic webbing to readily adapt to movements of the animal. One strip of webbing is provided as a chest strap 40 for encircling the chest and/or rib cage of the animal, just behind the fore legs, to securely fasten the harness assembly 14 to the animal. Preferably, the chest strap 40 includes an adjustable fastener, such as friction buckle/strap slide 42, so that the ends 40a, 40b of the chest strap 40 may be fastened at various positions relative to one another to snugly fit chests and/or rib cages of animals of various sizes, e.g. by pulling the ends 40a, 40b relative to the buckle 42, as well known in the art for such conventional buckles. Alternatively, ends 40a, 40b may be provided with lengths of hooked and/or looped plastic material (not shown) of the Velcro™ type, as well known in the art.

Another strip of webbing material is joined, e.g. stitched, at 41 to the chest strap 40 to serve as a collar strap 44 to fasten the harness assembly 14 to a standard-type collar that may be worn by the animal. The collar strap 44 is provided with an adjustable fastener, such as a friction buckle 46, hook and loop fastener, etc.

A pair of strips of webbing form back straps 18, 20 for spanning the back of the animal to support the harness assembly 14 on the animal's back. At one end, 18a, 20a, each back strap 18, 20 is joined, e.g. sewn, at 21 to the chest strap 40, preferably on opposite sides of the collar strap 44. The back straps 18, 20 cross and overlap one another toward the middle of the back of the animal, where they are joined, e.g. by stitching 24. Preferably, an adjustable fastener, such as a friction buckle 23, 25, hook and loop fastener, etc. is provided on each back strap 18, 20 between the chest strap 40 and the stitching 24, to allow for adjustment of the harness assembly 14 to the torso length of a particular animal.

Beyond the stitching 24, to the right of the stitching 24 in FIG. 2 another strip of webbing is provided as a tail strap 26 for supporting the back straps 18, 20 in a predetermined relationship. The tail strap 26 is intended to rest just above the tail of the animal. The tail strap 26 is joined, e.g. by stitching, to the back straps 18, 20 at 32 and 34.

Beyond the tail strap 26, to the right of the tail strap 26 in FIG. 2, another strip of webbing is provided as a leg strap 28 for supporting the back straps 18, 20 in a spaced parallel relationship to the tail strip 36, the spacing being sufficient to accommodate both the tail and the anal region of the animal, as shown in FIGS. 2 and 3. The leg strap 28 is attached respectively to the back straps 18, 20 by stitchings, etc. at 36 and 38.

Referring now to FIGS. 1–3, lengths of the back straps 18, 20 to the right of the leg strap 28 cooperate with respective ends 29, 30 of the leg strap 28 extending beyond the back straps 18, 20 to define first and second leg loops 50, 52. More specifically, the length of strap 18 terminating in end 18b is twisted to form a partial loop that is joined to end 29 of leg strap 28, by a friction buckle 51, hook and loop or other adjustable fastener, to form leg loop 50 for encircling an upper thigh portion of a left hind leg of the animal. Similarly, the length of strip 20 terminating in end 20b is twisted to form a partial loop that is joined to end 30 of lower strap 28, by a friction buckle 53, hook and loop or other adjustable fastener, to form leg loop 52 for encircling an upper thigh portion of a right hind leg of the animal.

As best shown in FIG. 2, additional strips of webbing provide braces 54, 56 that are attached at one end 54a, 56a to a portion of the back straps 18, 20 above the tail strip 26 by stitchings, etc. 55, 57, and attached at opposite ends 54b, 56b to a portion of the back straps 18, 20 forming the leg loops 50, 52 by stitchings 59, 61.

The attachment of the harness assembly 14 to an animal, such as a dog, is quite simple. The left hind leg of the dog is placed through the leg loop 50 and the right hind leg of the dog is placed through the leg loop 52 with the dog's tail passing through the opening formed between the two back straps 18, 20 and the tail strip 26, leg strap 28 (see FIGS. 1–3). The leg loops 50, 52 may be adjusted for tightness by adjusting the friction buckle 51, 53 or other adjustable fasteners. As shown in FIG. 1, the back straps 18, 20 are then laid over the animal's back such that the chest strap 40 is positioned just behind the animal's fore legs. This may initially require adjustment of the length of the back straps 18, 20 by adjusting friction buckles 23, 25 or other adjustable fasteners. Subsequently, the harness may be placed on and removed from the animal without adjustment of the back straps 18, 20. The chest strap is then wrapped around the dog's upper chest and/or rib cage and fastened by friction buckle 42 or other adjustable fastener, e.g. hook and loop fastener, to secure the harness in place. If the dog is wearing a collar, the free end 45 of the collar strap 44 may be looped around the collar and fastened back to itself, e.g. by friction buckle 46, hook and loop fasteners, etc. This further secures the harness assembly 14 in place. Alternatively, the head and fore legs of the animal may first be passed through the chest strap 40, and the rear legs subsequently passed through the leg loops 50, 52. Accordingly, the harness assembly 14 is fastened around the hind legs and chest of the dog, and anchored to the dog's collar, with the tail strap 26, leg strap 28, and portions of the back straps 18, 20 therebetween, surrounding the dog's tail and anal region.

The primary function of the harness assembly 14 is to provide collection bag fastening points for the collection bag that are spaced peripherally around the anal region of the dog, at which fastening points the collection bag fastening devices can be secured (see FIGS. 1 and 3). Although the number of fastening points and fastening devices can be varied, at least three are preferred to hold the bag in an open condition and four are most preferred, as illustrated.

In the exemplary embodiment of FIGS. 1–5, fastening points for attachment of the fastening devices are respectively provided on the tail strap 26 and leg strap 28 at the junctures of back straps 18, 20. These fastening points are located at upper and lower positions on both sides of the anal region of the animal (see FIGS. 1 and 3).

Figure 4:
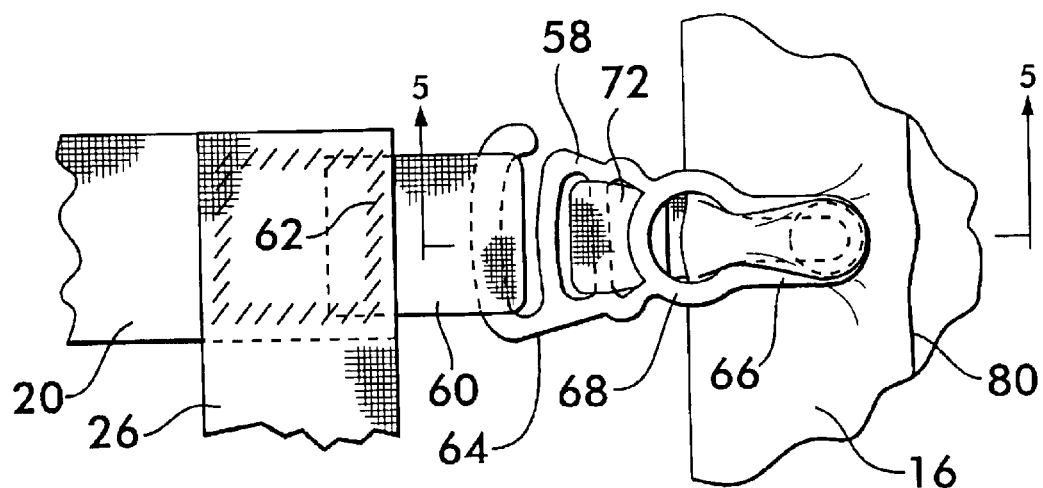
FIG. 4 is an enlarged view of a portion of the device of FIG. 1 showing the manner of attachment of the collection bag to the harness assembly.
Figure 5:
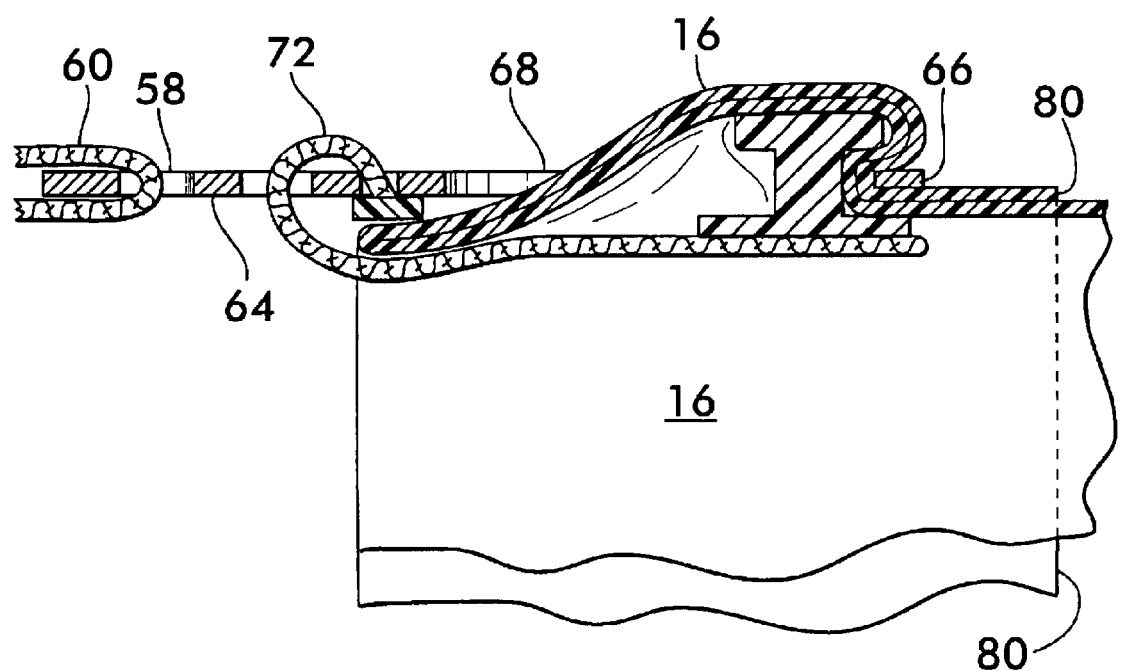
FIG. 5 is a cross-sectional view of a portion of the harness assembly and bag shown in FIG. 4, taken along line 5—5 of FIG. 4.

Referring now to FIGS. 2, 4 and 5, the fastening devices for securing the collection bag 16 (FIG. 4) to the harness assembly 14 at each of the aforesaid fastening points comprises a loop and stud fastener assembly 58 that is secured to the harness assembly 14 by a short loop 60 of webbing or other material by stitching at 62. The loop and stud fastener assembly 58 is of a conventional type most commonly used in hosiery garters and includes a wire frame member 64, the outer end 66 of which is formed in a narrow parallel walled loop which opens inwardly into an enlarged region 68. A resilient stud 70 is attached to the free end of a cloth retaining strip 72, the inner end of which is secured to the fastener frame member 64. The stud 70 is of essentially cylindrical shape and of a diameter permitting entrance into the enlarged region 68 of the fastener but too large to pass into the loop 66. An annular groove 74 in the stud 70 permits the sliding entrance of the stud into the loop 66 after the stud has first been inserted into the enlarged region 68. The stud can only be removed from the loop after it has been moved back to the enlarged region 68. Alternatively, a conventional suspender clip (not shown) having opposing jaws and a pivotable cam member for locking the jaws together, e.g. to grab the bag 16, may be used. Any other suitable fastening devices may be used, as will be appreciated by those skilled in the art.

As shown in FIG. 2, one of the fastener assemblies 58 is attached to the harness assembly 14 at each of the fastening points 60a, 60b, 60c and 60d. As shown in FIGS. 1, 2 and 3, this provides bag fastening devices on the harness assembly 14 at points spaced above and below, and to each side of the anus of the animal.

The collection bag 16 comprises a flexible plastic bag, which may be a gusseted type or standard (flat, non-gusseted) type. Such bags are often sold as kitchen scrap or garbage bags, are widely available in a variety of sizes and are quite inexpensive. The size found suitable for the average size dog measures approximately eight inches square.

As best shown in FIG. 3, plastic bags of this type typically comprise a generally tubular plastic body section 76 that is transversely heat sealed at 78 to close one end and is open at the opposite end 80 to form a continuous bag edge. Since bags of this type are made of relatively thin plastic, for example, 0.8 mil, it is preferred that the bag edge be folded over as shown in FIGS. 3–5 to provide a double thickness of material for attachment of the loop and stud fastener assemblies 58 (see FIG. 5). The bag is connected to a fastener by placing the doubled edge over the stud, inserting the stud in the enlarged fastener region 68, and sliding the stud into the loop 66. The bag is detached from the fastener by sliding the stud into the enlarged region and then removing the stud from the frame (see FIG. 5).

Although the bag may be attached to the harness assembly 14 before or after attachment of the harness assembly 14 to the dog, it is usually simpler to attach the bag before the harness assembly is secured to the dog. It may be desirable to attach the bag 16 after putting the harness assembly 14 on the dog since the dog's tail must pass between the bag 16 and the tail strap 26.

After the dog has exercised, the bag 16 and harness assembly 14 can be quickly removed as a unit by releasing the friction buckle or other fastener device 42, 46 of the chest strap 40 and collar strap 44 and pulling the harness rearwardly and downwardly to allow the dog to step out of the leg loops 50, 52. The bag can then be separated from the harness by opening the fastener assemblies 58. The bag may be sealed as desired, for example by wire or plastic bag ties, prior to disposal.

Although a plastic bag is preferred as a collection receptacle, in an emergency, an ordinary paper bag is serviceable although it may require extra care in handling. Since paper bags tend to lose their strength when wet, the plastic bags are much preferred, particularly since odors are virtually eliminated with the plastic bag. Plastic coated paper bags may also be used; however, their increased cost would not make them as attractive as the preferred plastic bags.

Although the invention can be used with other types of animals, it is primarily intended for use with dogs. Dogs are admirably clean animals in carrying out the elimination function and this helps to assure a complete recovery of the wastes by the collection bag.

The webbing strips are preferably of elastic textile webbing as are the loops 60 securing the fastener assemblies to the webbing strips. However, any suitable strip material may be used. The connection of the webbing strips at their various overlapped joints is preferably effected by stitching because of its strength, ease of fabrication, and absence of protrusions which might prove bothersome or injurious to the animal. Alternate methods of attachment of the webbing strips could also be employed, however, including riveting, adhesive bonding, melting or fusing, combinations of these methods, or any other means of attachment having sufficient strength to secure the strips/straps in the disclosed relationship.

Optionally, the back straps and/or any other portion of the harness assembly 14 is provided with conventional snaps, hook and loop type fasteners, or other releasable fasteners to facilitate attachment of an article of clothing such as a jacket, coat, raincoat, vest, cover, etc. for protecting the animal from the elements and/or environment. The article of clothing is configured with appropriately located complementary releasable fasteners to facilitate attachment to the harness assembly 14. For example, harness assembly 14 of FIGS. 1 and 2 is provided with several male portions 92 of conventional snaps secured by stitching, crimping, etc. as known in the art. An exemplary jacket type article of clothing 90 is shown in FIG. 1. The jacket 90 is provided with several female portions 94 of conventional snaps on the underside 91 of the jacket 90. The female portions 94 are similarly secured to the jacket 90 and are positioned for registering with the male portions 92 of the snaps. The jacket 90 can then be worn by the dog/animal by fastening the jacket 90 to the harness assembly 14 with the snaps.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A harness assembly adapted for attachment to an animal, the harness assembly comprising:
    a tail strap disposed so as to pass above and adjoin the tail of the animal;
    a leg strap disposed so as to pass below and adjacent to the anus of the animal from a left side to a right side along the animal's posterior;
    a pair of back straps disposed so as to pass over the back of the animal, said pair of back straps being joined to said tail strap and said leg strap to support said tail strap and said leg strap adjacent the anal region of the animal; and
    a chest strap joined to said pair of back straps and disposed so as to encircle a chest region of the animal.

2. The harness assembly of claim 1, further comprising:
    a plurality of fastening devices, each of said plurality of fastening devices being joined to at least one of said tail, leg and back straps so as to be adjacent the anal region of the animal.

3. The harness assembly of claim 2, wherein each of said plurality of fastening devices comprises an independently attachable and releasable fastener assembly for positive connection to any selected point along a continuous open edge of a bag.

4. The harness assembly of claim 3, wherein at least one of said plurality of fastening devices is positioned adjacent each intersection of said tail strap and one of said back straps.

5. The harness assembly of claim 1, wherein said back straps are joined to said chest strap adjacent a shoulder region of the animal.

6. The harness assembly of claim 1, further comprising:
a pair of leg loops, each of said pair of leg loops being joined to said leg strap and being disposed to encircle an upper thigh portion of a hind leg of the animal.

7. The harness assembly of claim 6, wherein each of said pair of leg loops comprises at least two distinct strips secured to one another by an adjustable fastener.

8. The harness assembly of claim 7, wherein each of said adjustable fasteners comprises a friction buckle.

9. The harness assembly of claim 6, wherein each of said leg loops is at least partially formed by a distinct, continuous strip that forms at least part of a respective back strap.

10. The harness assembly of claim 6, further comprising a pair of leg braces, each of said pair of leg braces joining a respective one of said back straps to a respective one of said leg loops.

11. A harness assembly adapted for attachment to an animal, the harness assembly comprising:
a tail strap disposed so as to pass above the tail of the animal;
a leg strap disposed so as to pass below the anus of the animal;
a pair of back straps disposed so as to pass over the back of the animal, said pair of back straps being joined to said tail strap and said lea strap to support said tail strap and said lea strap adjacent the anal region of the animal; and
a chest strap joined to said pair of back straps and disposed so as to encircle a chest region of the animal;
wherein each of said plurality of fastening devices comprises an independently attachable and releasable fastener assembly for positive connection to any selected point along a continuous open edge of a bag; and
wherein at least one of said plurality of fastening devices is positioned adjacent each intersection of said leg strap and one of said back straps.

12. The harness assembly of claim 11, wherein an additional one of said plurality of fastening devices is positioned adjacent each intersection of said tail strap and one of said back straps.

13. A harness assembly adapted for attachment to an animal, the harness assembly comprising:
a tail strap disposed so as to pass above the tail of the animal;
a leg strap disposed so as to pass below the anus of the animal;
a pair of back straps disposed so as to pass over the back of the animal, said pair of back straps being joined to said tail strap and said leg strap to support said tail strap and said leg strap adjacent the anal region of the animal;
a chest strap joined to said pair of back straps and disposed so as to encircle a chest region of the animal;
a collar strap joined to said chest strap intermediate intersections of said chest strap with said back straps; and
an adjustable fastener for selectively securing said collar strap around a collar worn by the animal.

14. A harness assembly adapted for attachment to an animal, the harness assembly comprising:
a tail strap disposed so as to pass above the tail of the animal;
a leg strap disposed so as to pass below the anus of the animal;
a pair of back straps disposed so as to pass over the back of the animal, said pair of back straps being joined to said tail strap and said leg strap to support said tail strap and said leg strap adjacent the anal region of the animal; and
a chest strap joined to said pair of back straps and disposed so as to encircle a chest region of the animal;
wherein each of said back straps comprises at least two distinct strips secured to one another by an adjustable fastener.

15. The harness assembly of claim 14, wherein each of said adjustable fasteners comprises a friction buckle.

16. A harness assembly adapted for attachment to an animal, the harness assembly comprising:
a tail strap disposed so as to pass above the tail of the animal;
a leg strap disposed so as to pass below the anus of the animal;
a pair of back straps disposed so as to pass over the back of the animal, said pair of back straps being joined to said tail strap and said leg strap to support said tail strap and said leg strap adjacent the anal region of the animal;
a chest strap joined to said pair of back straps and disposed so as to encircle a chest region of the animal;
a pair of leg loops, each of said pair of leg loops being joined to said leg strap and being disposed to encircle an upper thigh portion of a hind leg of the animal;
a pair of leg braces, each of said pair of leg braces joining a respective one of said back straps to a respective one of said leg loops; and
a plurality of fastening devices, each fastening device being joined to at least one of said tail, leg and back straps adjacent the anal region of the animal, each fastening device being adapted for positive connection to any selected point along a continuous open edge of a collection bag, the fastener devices being peripherally spaced around the anal region of the animal to cause an attached collection bag to encircle the anal region of the animal.

17. The harness assembly of claim 16, wherein each of said leg loops is at least partially formed by a discrete, continuous strip that forms at least part of a respective back strap.

18. The harness assembly of claim 16, wherein each of said pair of leg loops comprises at least two distinct strips secured to one another by an adjustable fastener.

19. The harness assembly of claim 18, wherein each of said back straps comprises at least two distinct strips secured to one another by an adjustable fastener.

20. The harness assembly of claim 19, wherein each of said adjustable fasteners comprises a friction buckle.

21. The harness assembly of claim 19, further comprising:
a collar strap joined to said chest strap intermediate intersections of said chest strap with said back straps, said collar strap being selectively securable around a collar worn by the animal.

22. The harness assembly of claim 16, further comprising a plurality of releasable fastener devices, each of said plurality of releasable fastener devices being mounted to at least one of said straps of the harness assembly, the harness assembly further comprising an article of clothing, the article of clothing having complementary releasable fastener device positioned for mating with the releasable fastener devices of the harness assembly for releasable mounting of the article of clothing to the harness assembly.

23. The harness assembly of claim 22, wherein the releasable fastener devices are mounted to said back straps adjacent said chest strap.

24. A harness assembly adapted for attachment to an animal, the harness assembly comprising:
- a tail strap disposed so as to pass above the tail of the animal;
- a leg strap disposed so as to pass below the anus of the animal;
- a pair of back straps disposed so as to pass over the back of the animal and connecting the tail strap and leg strap adjacent the anal region of the animal;
- a chest strap joined to said pair of back straps and disposed so as to encircle a chest region of the animal, said pair of back straps overlapping one another intermediate said tail strap and said chest strap;
- a pair of leg loops, each of said pair of leg loops being joined to said leg strap and being disposed to encircle an upper thigh portion of a hind leg of the animal;
- a pair of leg braces, each of said pair of leg braces joining a respective one of said back straps to a respective one of said leg loops; and
- a plurality of fastening devices, each fastening device being joined to at least one of said tail, leg and back straps adjacent the anal region of the animal, each fastening device being adapted for positive connection to any selected point along a continuous open edge of a collection bag, the fastener devices being peripherally spaced around the anal region of the animal to cause an attached collection bag to encircle the anal region of the animal.

25. The harness assembly of claim 24, wherein each of said leg loops is at least partially formed by a distinct, continuous strip that forms at least part of a respective back strap.

26. The harness assembly of claim 24, wherein said plurality of fastening devices are joined to said back straps intermediate said tail strap and said leg strap.

27. The harness assembly of claim 24, further comprising a plurality of releasable fasteners, each of said plurality of releasable fasteners being mounted to at least one of said collar and back straps of the harness assembly, the harness assembly further comprising an article of clothing, the article of clothing having a complementary releasable fastener positioned for mating with the releasable fastener of the harness assembly for releasable mounting of the article of clothing to the harness assembly.

28. A device for collecting animal wastes comprising:
- the harness assembly of claim 24; and
- an imperforate bag of thin plastic material, said bag being secured to said harness assembly by said plurality of fastening devices.

* * * * *